April 12, 1927.  1,624,038
A. J. CARTER
RHEOSTAT
Filed July 2, 1925   2 Sheets-Sheet 1

Inventor
Alva J. Carter
by Max W. Zabel Atty.

April 12, 1927.
A. J. CARTER
1,624,038
RHEOSTAT
Filed July 2, 1925 2 Sheets-Sheet 2
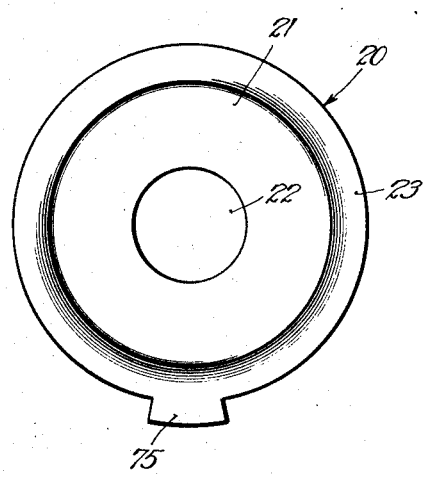
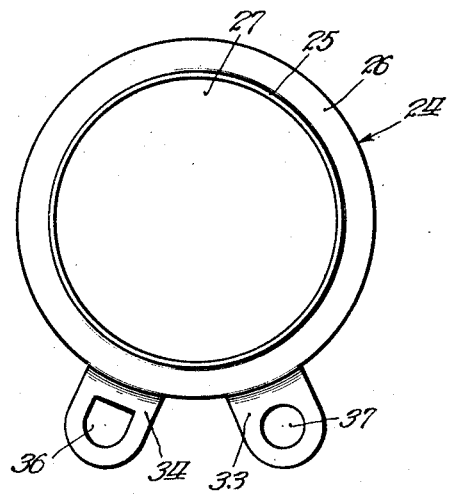
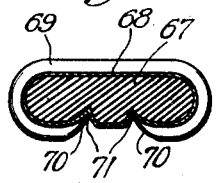
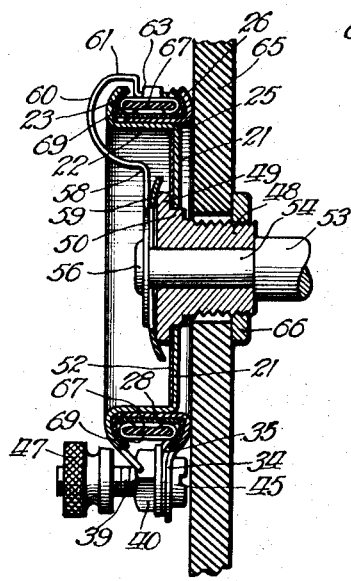
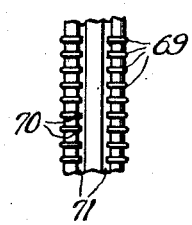
Inventor
Alva J. Carter
by May W. Gabel Atty.

Patented Apr. 12, 1927.

1,624,038

UNITED STATES PATENT OFFICE.

ALVA J. CARTER, OF CHICAGO, ILLINOIS, ASSIGNOR TO CARTER RADIO COMPANY, OF CHICAGO, ILLINOIS, A CORPORATION OF ILLINOIS.

RHEOSTAT.

Application filed July 2, 1925. Serial No. 41,120.

My invention relates to rheostats, and more particularly to a rheostat comprising a resistance element that is arranged in an annular form.

It is the purpose of my invention to provide new and improved means for supporting a resistance element, which may be either a coiled element or winding, or a strip resistance element in an annular form, so that a movable contact member turning around a fixed axis will engage therewith. The means preferably comprises an annular flanged member having a web through which securing means is adapted to pass for mounting the rheostat upon a suitable support, and a ring-like flanged member which is held in engagement with the annular member adjacent the periphery thereof. This is particularly desirable, as in this manner a more truly circular mounting can be obtained, as the holding of the two parts together adjacent the outer edge of the annular member prevents undulations in the circumference of the circular grooved member formed by the two parts, that is, the annular member and the ring-like member.

It is a further purpose of my invention to provide said members with flanges that are so made that the same will wedgingly engage with the resistance element so as to force the same into a true circular form. This makes the rheostat of easier operation and assures a good contact of the moving contact member with the resistance element at all times. In assembling the device the resistance element is placed between the flanged annular element and the flanged ring, after which the flanged ring is forced onto the flanged annular element, whereupon the wedging faces of the flanges cooperate to force the resistance element inwardly toward the center of the device into a truly circular from.

It is a further purpose of my invention to provide a rheostat that is simple in construction and easier to construct, and which reduces the amount of material and labor necessary to construct the same. One of the advantages of my construction is that the resistance element can be asembled with the flanged members without assembling the central bearing member with the flanged members. Another advantage is that the terminals are mounted upon ears integral with one of the flanged members, preferably the ring-like member. A novel form of insulating means for one of said terminals is also provided.

It is another purpose of my invention to provide new and improved means for connecting one end of the winding with one of the terminals, which comprises a strip of good conducting material embracing the resistance element and engaging with the terminal, said strip of good conducting material being engaged by the moving contact when the portion of the winding is reached that the same embraces, thus cutting out all of the turns of the resistance and preventing undue and harmful heating of the extreme end portion of the resistance element when the movable contact member is in engagement with the end portion thereof nearest the terminal.

It is another purpose of the invention to provide a new and improved high-resistance element comprising a strip of insulating material which is coated with a high-resistance coating such as india ink or other fluid containing particles of carbon, and relatively good conducting means engaging such strip and in electrical contact with the coating, so that said relatively good conducting means is engageable by the moving contact member to thus prevent any damage to the coating due to engagement of the moving contact member therewith. Furthermore, by providing a large number of the conducting members transversely of the resistance element spaced from each other so that the moving contact will successively engage with the same, a variable high resistance is obtained that can be adjusted to practically any desired amount, as the steps by which the resistance is cut out or placed in the circuit can be made so small that a substantially uniformly increasing or decreasing resistance can be obtained as the movable contact member is moved along the resistance element.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings,—

Fig. 5 is a face view of the annular flanged element of my improved rheostat;

Fig. 6 is a face view of the ring element of my improved rheostat;

Fig. 7 is a fragmentary sectional view of a modified form of rheostat embodying my invention;

Fig. 8 is a view similar to Fig. 2, of a rheostat embodying my improved high-resistance element;

Fig. 9 is a fragmentary development into a plane of my improved high-resistance element; and Fig. 10 is an enlarged, transverse, sectional view thereof.

Figure 1:
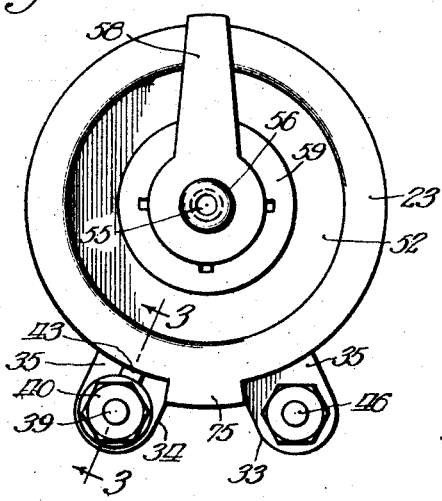
Fig. 1 is a rear face view of my improved rheostat.

Referring in detail to the drawings, my improved rheostat comprises an annular member 20, shown in Fig. 5, having a web portion 21 and a central opening 22. Said web portion merges into a flange 22 that extends laterally therefrom, and which connects said web portion with the outwardly extending flange 23, which is annular in form. The flange 23, it will be noticed, curves or inclines toward the web portion 21, to thus provide an undercut flange portion on the periphery of the annular member 20. Co-operating with the annular member 20 is a ring-like member 24, which is provided with a laterally extending flange portion 25 which fits snugly over the flange 22 and is adapted to be forced thereon by pressure, such as by placing the parts in a suitable press. The ring-like member 24 is also provided with an outwardly extending flange 26 corresponding to the flange 23 on the member 20. Said flange 26 is inclined toward the flange 23 when in position, as clearly shown in Fig. 2, so that the flanges 25, 23 and 26 define an annular groove that is larger at the inside than at the outside thereof, and which has inclined or wedging faces on the side walls 23 and 26 thereof. The ring member 24 is further provided with a large central opening 27 which is of such a diameter that the flange 22 will fit within the same.

Figure 3:
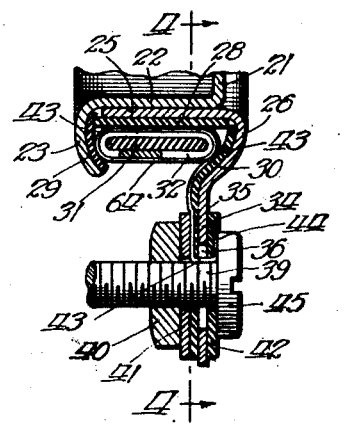
Fig. 3 is an enlarged section of a portion of the rheostat taken substantially on the line 3—3 of Fig. 1.

Referring now to Fig. 3, it will be seen that a ring-like member of insulating material 28 is provided within the groove defined by the flanges 23 and 26, said member lying adjacent the flange or annular seat 25. Furthermore, the insulating ring 29 is provided, which lies against the inner face of the flange 23, and the insulating ring 30 is provided that lies against the inner face of the flange 26.

The resistance element shown in Figs. 1 to 7, inclusive, comprises a strip of insulating material 31, around which is wound or coiled a resistance wire 32, said wire 32 being wound in a continuous coil from end to end of the strip 31. The resistance element lies within the annular groove or seat provided between the flanges 23, 25 and 26, and is held in position therein in a true circular form due to the fact that when the member 24 is pressed on the member 20 the wedging faces of the flanges 23 and 26 will cause the resistance element to be forced inwardly to firmly engage against the insulating lining 28, which in turn is firmly engaged with the annular seat 25.

Figure 4:
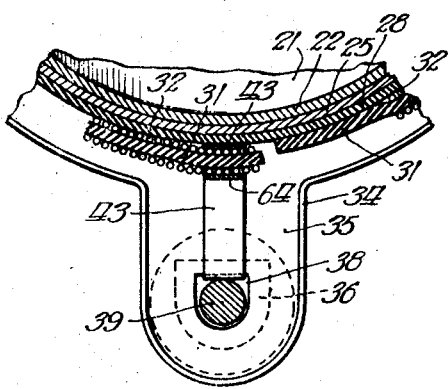
Fig. 4 is a section taken substantially on the line 4—4 of Fig. 3.

It will be noted from Fig. 6 that the ring member 24 is provided with a pair of ears 33 and 34. The insulating ring 30 is provided with similar ears 35 aligning with the ears 33 and 34. The ear 34 is provided with a substantially D-shaped opening 36 therein, while the ear 33 is provided with any form of opening, preferably a circular opening 37. The ears 35 are provided with openings aligning with the openings 36 and 37, and corresponding in shape to said openings, the openings in the ears 35, however, being smaller than the openings in the ears 33 and 34, the opening 38 in the ear 35 aligning with the ear 34, as shown in Fig. 4. The ears 33 and 34 are provided for mounting suitable terminals on the rheostat. The terminal on the ear 34 comprises a binding screw 39, a nut 40, a conducting washer 41 and an insulating washer 42.

In order to connect the one end of the winding 32 with the terminal binding screw 39 a strip of good conducting material 43 is wound around the last few turns of the winding 32, as will be clear from Figs. 3 and 4. Said strip is preferably of copper and extends along the inner face of the ear 35 and between the washer 41 and said ear, then through the openings 38, 36 and the opening in the washer 42, and then is bent back on itself, as indicated at 44, so as to lie in engagement with the head 45 of the binding screw 39. Said good conducting member 43 thus engages with the washer 41 and the head 45, and also with the shank of the screw 39, making a good contact with said binding screw. By providing the D-shaped opening 38 in the member 35 and the D-shaped opening 36 in the member 34, sufficient clearance is provided in the insulating ear 35 to allow for the passage of the conducting strip 43 through the opening beside the screw 39, and at the same time the conducting strip is insulated from the ear 34, the D-shaped opening providing sufficient clearance under all circumstances so as to avoid contact between the strip 43 and the ear 34. Also, due to the fact that the opening in the ear 34 is larger than the opening in the washer 42 and in the insulating ear 35, the shank of the screw 39 is held out of engagement with the ear 34.

A binding screw 46 is mounted on the ear 33, and as no insulating washer 42 is provided between the head thereof and the ear 33, said terminal or binding screw 46 is electrically connected with the ring 26, and consequently also electrically connected with the web 21. Suitable thumb nuts 47 may be provided on the binding posts in order to connect conductors thereto, as is customary.

Figure 2:
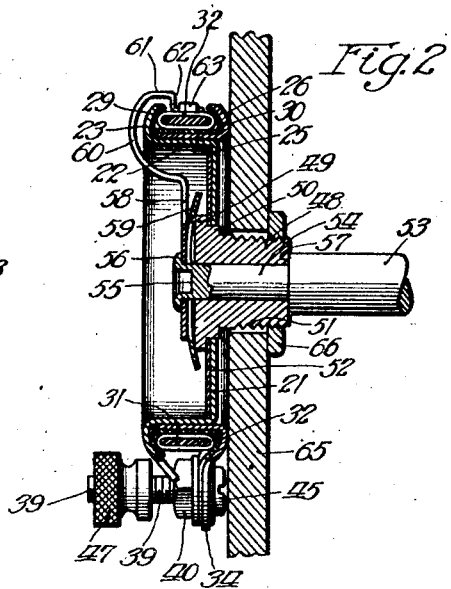
Fig. 2 is a vertical sectional view thereof, showing the same mounted on a panel.

A bearing member 48 is provided that extends through the opening 22 in the web 21. Said bearing member 48 is provided with an enlargement or flange 49, with a portion of slightly smaller diameter 50, and with a threaded portion 51 of reduced diameter. The portion 50 snugly fits the opening 22, while the flange 49 serves to hold a disk 52, which may serve as a name plate, and which may be of paper or other insulating material, if desired, in engagement with the web 21. A pivot member or shaft 53 is provided with a reduced end portion 54 fitting within the opening in the bearing member 48. The reduced end portion 54 preferably terminates in a hollow or recessed portion 55, which may be headed over as at 56, thus bringing the shoulder 57 between the enlarged portion of the shaft 53 and the reduced portion 54 thereof against the bearing 48. The movable contact arm 58 is placed in position before the portion 56 is riveted over. The ear 75 on the member 20 acts as a stop for said contact arm 58. In order to insure that the movable contact 58 is in good electrical connection with the bearing member 48, a spring conducting washer 59, which is slightly cupped out, as indicated in Fig. 2, is positioned between the contact member 58 and the bearing member 48, said washer being of such proportions that the same will contact with the member 48 and not with the member 52 when the same is compressed. The member 58, of course, is mounted so as to rotate with the shaft 53, and is provided with an arcuate portion 60 extending around and spaced from the flange 23, a laterally extending portion 61, an inwardly extending portion 62, and a contact shoe portion 63 that engages with the resistance wire 32. It will be noted, however, that when the member 58 is moved around to such a position that the shoe 63 reaches the end of the winding connected with the terminal 39, the same will engage directly with the portion 64 of the conducting strip 43 that extends over or outwardly of the resistance element, thus cutting out all of the turns of the resistance element and connecting the movable contact member directly with the terminal 39, thus connecting the terminals 39 and 46 through a good conducting path, which is of substantially negligible resistance.

When the device is mounted in a position on a panel 65, a nut 66 is threaded on the threaded portion of the member 48 to firmly mount the device in position on the panel.

Instead of providing an outwardly opening groove or annular recess in the rheostat, the same may be arranged as shown in Fig. 7, in which the member 20′ is provided with an outwardly bowed or curved portion 23′ corresponding to the flange 23, and a laterally extending flange 22′ corresponding with the flange 22 on the member 20. The ring member 24′ is provided with an outer flange 25′ which fits snugly within the flange 22′ and may be forced into engagement therewith in a press. The ring is further provided with an inwardly extending flange 26′, the flange 26′ and the curved portion 23′ inclining toward each other toward the center of the member 20′, to thus provide a groove that is open on the inner side thereof and is smaller on the inner side than on the outer side. The insulating members 28′, 29′ and 30′ are provided to insulate the resistance element from the metallic parts of the device, said resistance element being made in the same way as the element shown in Figs. 1 to 4, inclusive. The movable contact element 58′ having the bowed portion 60′ therein is provided with a contact shoe 63′ that engages with the inner side of the winding or resistance element, instead of the outer side thereof, as in Figs. 1 to 4, inclusive. It will be seen that with the arrangement described and shown in Fig. 7, the resistance element will be forced outwardly into a true circular form due to the wedging action of the curved portion 23′ and the flange 26′ when the parts 20′ and 24′ are forced into engagement with each other.

In Figs. 8, 9 and 10, the rheostat construction is the same as that shown in Figs. 1 to 4, inclusive, except that a different form of resistance element is provided, which comprises a strip of insulating material 67 which is provided with a high-resistance coating 68, this being done by dipping the strip in india ink or other liquid in which small particles of carbon or other high-resistance conducting material are suspended. A conductor is then wound around the same, after which portions thereof are cut out so that the turns thereof are entirely independent, producing the tranversely extending conducting strips 69, which are somewhat pointed at the ends 70 thereof and are slightly embedded in grooves 71 formed in the member 67 at the time the cutting operation is performed. Thus the conducting members 69 are in good electrical contact with the coating 68, and it will be obvious that as the moving contact 58 is moved along the resistance element shown in Figs. 9 and 10, any desired amount of the high resistance obtained by the coating 68 can be thrown into the circuit, the members 69 being preferably spaced such a distance apart that the shoe 63 on the movable contact member 58 will engage with only one of the transversely extending members 69 at a time.

Having thus described my invention, what I desire to claim and secure by United States Letters Patent is:

1. A device of the character described a winding, and means for supporting said winding, comprising a circular member having a laterally extending portion forming an annular base for said winding and a side flange extending from one edge of said base, a second member secured to said first member and having a side flange extending at the other edge of said base said flanges inclining toward each other as they extend from said base to clamp said winding against the base.

2. In a device of the character described a resistance element and means for supporting said resistance element comprising an annular member having a laterally extending flange forming an annular seat for said element, a second annular member having a laterally extending flange fitting tightly in said first named flange so that the friction between the two flanges retains said members together and side flanges on said members to retain said element on said seat.

3. In a device of the character described, a winding, and means for supporting said winding comprising a pair of circular members having interengaging laterally extending flanges to provide an annular seat for said winding, and flanges inclined toward each other to wedge said winding into annular form on said seat.

4. In a device of the character described, a winding, and means for supporting said winding comprising a pair of circular members having interengaging laterally extending flanges to provide an annular seat for said winding, and outwardly extending flanges inclined toward each other to wedge said winding into annular form on said seat.

5. In a device of the character described, a winding, terminals for said winding, and means for supporting said winding comprising a flanged annular member having a web, means extending through said web for securing said device to a support, a flanged ring-like member mounted on said annular member, and ears on said ring-like member for supporting said terminals.

6. In a device of the character described, a winding, and means for supporting said winding comprising a pair of annular members having laterally extending flanges one fitting inside the other to provide an annular seat for said winding, side flanges to provide an annular groove, an annular insulating member between said seat and said winding, and ring-like insulating members between said side flanges and said winding.

7. In a device of the character described, a winding, and means for supporting said winding comprising a pair of circular members having engaging laterally extending flanges to provide an annular seat for said winding, side flanges to provide an annular groove, a terminal supporting ear on one of said side flanges, a ring-like insulating member between said last side flange and said winding, and an ear on said insulating member aligning with the ear on said flange.

8. In a device of the character described, a winding, and means for supporting said winding comprising a pair of circular members having engaging laterally extending flanges to provide an annular seat for said winding, side flanges to provide an annular groove, a terminal supporting ear on one of said side flanges, a ring-like insulating member between said last side flange and said winding, and an ear on said insulating member aligning with the ear on said flange, each of said ears having openings therein, the opening in the insulating ear being smaller than the opening in the ear of said flange.

9. In a device of the character described, a winding, and means for supporting said winding comprising a pair of circular members having engaging laterally extending flanges to provide an annular seat for said winding, side flanges to provide an annular groove, a pair of terminal supporting ears on one of said side flanges, and a ring-like insulating member, having a pair of ears aligning with said first ears, between said winding and said side flange.

10. In a device of the character described, a winding, terminals for said winding, and means for supporting said winding comprising a flanged annular member having a web, means extending through said web for securing said device to a support, a flanged ring-like member mounted on said annular member, ears on said ring-like member for supporting said terminals, one of said terminals engaging one of said ears, and means for insulating the other of said terminals from the other of said ears.

11. In a device of the character described, a coiled resistance element, a support therefor, a contact member engaging said resistance element and movable therealong, a terminal, and a low-resistance member connecting said terminal with said coiled element adjacent one end thereof, said low-resistance member extending around said coiled element in close contact with a plurality of the turns thereof.

12. In a device of the character described, a resistance element, a support therefor, a contact member engaging said resistance element and movable therealong, a terminal, and a strip of low resistance material connected to said terminal and wrapped around said resistance element.

13. In a device of the character described, a coiled resistance element, a support therefor, a contact member engaging said resistance element and movable therealong, a terminal, and a low-resistance member connecting said terminal and said coiled element adjacent one end thereof, said low-resistance member extending between said movable contact member and said coiled element when engaged thereby to short circuit said resistance element.

14. In a device of the character described, a coiled resistance element, a support therefor, an apertured ear on said support, a contact member engaging said resistance element and movable therealong, a headed terminal insulated from said support and extending through said aperture, and a low-resistance member connected with said coiled element and extending through said aperture and engaging with the head of said terminal.

15. In a device of the character described, a coiled resistance element, a support therefor, an apertured ear on said support, a contact member engaging said resistance element and movable therealong, a headed terminal insulated from said support, the insulating means for said terminal comprising an insulating member having an ear aligning with said first ear and provided with a smaller aligning aperture, said terminal extending through said apertures, and a low-resistance member connected with said coiled element and extending through said apertures and engaging with the head of said terminal.

16. In a device of the character described, a resistance element, and means for supporting said element comprising a flanged annular member having a web, means extending through said web to secure said device to a support, and a flanged ring-like member mounted on said annular member, said flanged members collectively forming an annular grooved seat for said resistance element.

In witness whereof, I hereunto subscribe my name this 2 day of June, A. D. 1925.

ALVA J. CARTER.